(No Model.)
F. D. GODDARD.
STOVEPIPE DAMPER.
No. 565,976. Patented Aug. 18, 1896.
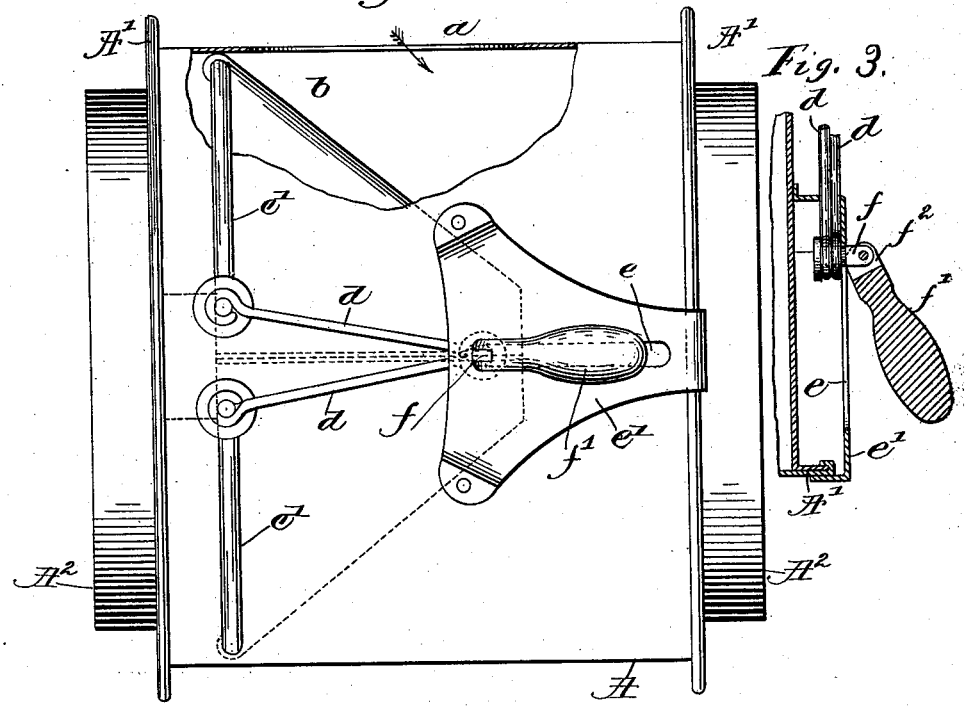
Fig. 1.
Fig. 3.
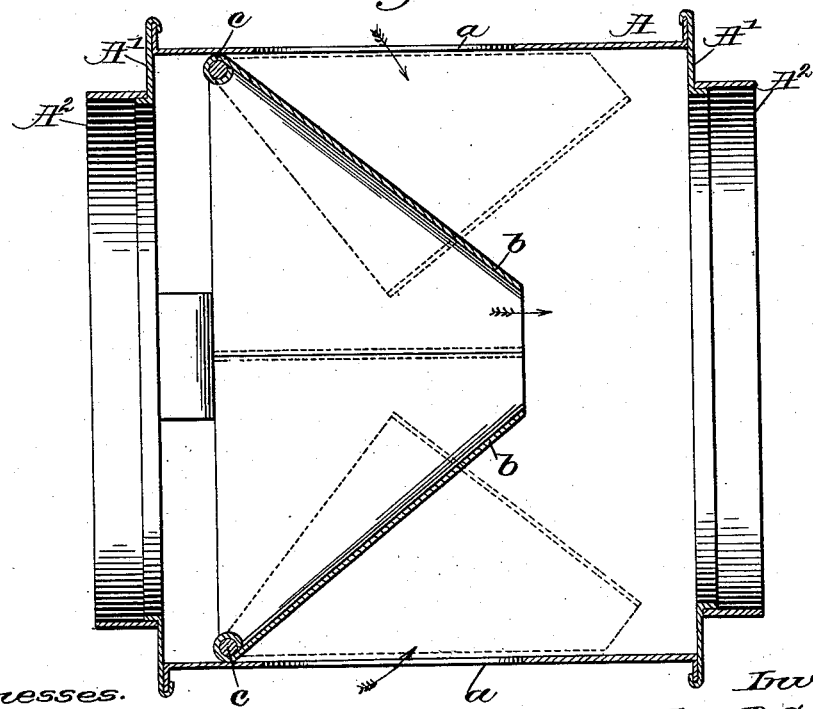
Fig. 2.
Witnesses.
A. C. Harmon
Thomas J. Drummond
Inventor.
Fred D. Goddard.
by Crosby & Gregory attys.

UNITED STATES PATENT OFFICE.

FRED D. GODDARD, OF EVERETT, MASSACHUSETTS.

STOVEPIPE-DAMPER.

SPECIFICATION forming part of Letters Patent No. 565,976, dated August 18, 1896.

Application filed November 29, 1895. Serial No. 570,329. (No model.)

*To all whom it may concern:*

Be it known that I, FRED D. GODDARD, of Everett, county of Middlesex, State of Massachusetts, have invented an Improvement in Stovepipe-Dampers, of which the following description, in connection with the accompanying drawings, is a specification, like letters on the drawings representing like parts.

This invention is intended as an improvement on the damper made the subject of Letters Patent No. 492,854, dated March 7, 1893. In the damper referred to the conical halves are operated by rotating one part of the damper on another part, and, in practice, soot and smoke by contact with the parts cause the same to hold together or become set, so as not to be readily moved when the strength of the draft is to be changed. The employment of the conical halves in an external case having external air-inlets makes one of the very best dampers; and the object of this invention is to combine with the said halves and the external case actuating devices which may be easily operated and confined in any desired adjusted position.

Figure 1, in side elevation, shows my improved stovepipe-damper with the casing partially broken out and the conical halves closed. Fig. 2 shows a longitudinal section of the same, the dotted lines showing the halves opened; and Fig. 3 is a detail of the locking device.

The external casing A has end pieces A' and attached collars $A^2$ to fit the smokepipe used. The casing has, as shown, two cold-air inlets $a\ a$. At its inner side there are two conical halves $b\ b$, which are attached at their larger or inner ends to rock-shafts $c$, mounted in the casing and having each an arm $c'$, extended at right angles to the shaft and lying close to the outside of the casing. These arms are each provided with a link $d$, pivoted thereon and united at their ends by a suitable pin $f$, having mounted on it a handle $f'$, having an eccentric portion $f^2$, the pin lying in a slot $e$ of the plate $e'$, suitably attached to the casing. The drawing Fig. 1 shows the conical halves closed, the handle holding them in that position. To open the dampers and let the fire burn, lift the handle to remove its eccentric end from the plate $e'$ and draw the pin along the slot $e$ toward its outer end, and then by again turning the handle or letting it drop the eccentric portion thereof will come against the plate $e'$ and again lock the conical halves in adjusted position.

The described damper is very simple and can always be opened and closed readily and has no tendency to rust or set in any place.

The handle $f'$ and plate $e$ constitute a locking device, and instead of the particular locking device I may use any suitable well-known equivalent devices.

Having described my invention, what I claim as new, and desire to secure by Letters Patent, is—

1. The herein-described stovepipe-damper, consisting of an outer casing having ends and collars, two conical halves, two rock-shafts having arms, links connected thereto, and a locking device to hold the links in adjusted position, substantially as described.

2. The herein-described stovepipe-damper, consisting of an outer casing having ends and collars, two conical halves, two rock-shafts having arms, links connected thereto, and a locking device containing a handle having an eccentric portion to operate, substantially as described.

In testimony whereof I have signed my name to this specification in the presence of two subscribing witnesses.

FRED D. GODDARD.

Witnesses:
GEO. W. GREGORY,
MARGARET A. DUNN.